UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

1,189,804.     Specification of Letters Patent.     Patented July 4, 1916.

No Drawing.     Application filed March 4, 1907. Serial No. 360,387.

*To all whom it may concern:*

Be it known that I, CARLETON ELLIS, a citizen of the United States, and resident of White Plains, in the county of Westchester and State of New York, have made certain new and useful Inventions Relating to Paint or Varnish Removers, of which the following is a specification.

This invention relates to paint or varnish removers and relates especially to removers comprising chlorinated or other compounds having an acid forming tendency in which antacid materials are used to obviate or correct such tendency.

Chlorinated organic solvents, such as carbon tetrachlorid, are desirable as ingredients for paint or varnish removers because reducing or destroying their inflammable character. Such remover ingredients, which include chlorbenzol and chlortoluol in some cases have an acid forming tendency, that is, have either acid properties or have a tendency to form in connection with the alcoholic and other remover ingredients bodies of an acid character which are undesirable, as is also sometimes the case with other esterification products containing chlorin or other acid radicals. Antacid material is therefore desirable to prevent or neutralize such acid tendency in the remover and may comprise inorganic neutralizing material, such, for example, as zinc oxid, calcium oxid or magnesium oxid, preferably in the light levigated or precipitated form. Organic antacid neutralizing material is, however, preferable, since it is more certainly and thoroughly incorporated throughout the entire remover, as well as being somewhat more desirable in its action, anilin, urea, and diamino-benzene being desirable organic bodies of this character. Other antacid material which seems to prevent or retard the acid tendency in removers of this character may comprise aromatic organic bodies, such as menthol, terpineol, methylprotocatechuic aldehyde, safrol, thymol, guaiacol, methyl and other salicylates, geraniol, citronellol. One or more of such antacid agents may be used in removers in connection with suitable loosening finish solvent material, that is, solvent material having a generally alcoholic character or action in removers, such, for example, as methyl, ethyl, amyl and denatured alcohol, acetone, methyl acetone, methyl ethyl ketone, oil of acetone, pinacolin, light oil of hard wood tar, butyrone and allied solvents. In addition to the chlorinated hydrocarbon solvents referred to, other penetrating finish solvent material, that is, solvent material having a generally benzolic character for action in removers, may also be used, such as benzol, toluol, xylol, cumene, benzin and various other petroleum hydrocarbons and methyl, ethyl, amyl and other ethers and other esteric compounds. Although not necessary in all cases suitable stiffening material may be employed, such as wood flour, starch, whiting, infusorial earth, as well as the antacid material of this character, such as zinc, calcium or magnesium oxid and also film-forming stiffening material may be used, such as soapy or waxy bodies, nitrated cellulose and other solid organic bodies having the property of forming an evaporation retarding film over the remover surface when in use. All the ingredients are preferably thoroughly incorporated by agitation at the desired slight increase of temperature, the soapy, waxy or other film-forming stiffening material being preferably first dissolved in the more energetic solvents, although not necessarily so compounded. An illustrative remover of this character may comprise carbon-tetrachlorid 40 gallons, denatured alcohol 55 gallons, ceresin wax 20 pounds, anilin 10 pounds and light magnesia 10 pounds. Another illustrative remover may comprise carbon-tetrachlorid 60 gallons, ethyl alcohol 35 gallons, ceresin wax 25 pounds and light magnesia 10 pounds. Another desirable remover may comprise carbontetrachlorid 50 gallons, light oil of hard wood tar 40 gallons, ceresin wax 25 pounds, wood flour 50 pounds, zinc oxid 10 pounds, urea 5 pounds, citronellol 5 pounds. Another illustrative remover may comprise chlorbenzene 40 gallons, carbon-tetrachlorid 15 gallons, denatured alcohol 25 gallons, amyl acetate 5 gallons, methyl acetate 10 gallons, light magnesia 20 pounds and paraffin or ceresin wax 10 pounds, although, of course, the film-forming stiffening materials may be omitted in these removers when desired.

This invention has been described in connection with a number of illustrative ingredients, formulas, proportions and processes, to the details of which disclosure the invention is not, of course, to be limited.

What is claimed is:—

1. The paint or varnish remover comprising approximately carbon-tetrachlorid 40 gallons, denatured alcohol 55 gallons, ceresin wax 20 pounds, anilin 10 pounds and light magnesia 10 pounds.

2. The paint or varnish remover comprising approximately carbon-tetrachlorid 40 gallons, alcohol 55 gallons, ceresin wax 20 pounds, anilin 10 pounds and magnesia 10 pounds.

3. The paint or varnish remover comprising approximately non-inflammable chlorinated solvent material 40 gallons, loosening finish solvent material 55 gallons, evaporation-retarding stiffening material and antacid material, including anilin.

4. The paint or varnish remover comprising non-inflammable chlorinated organic solvent material, loosening finish solvent material miscible therewith, stiffening material and antacid material comprising anilin.

5. The paint or varnish remover comprising chlorinated organic solvents, loosening solvents miscible therewith, stiffening material and antacid material comprising anilin.

6. The paint or varnish remover comprising chlorinated organic solvent material, stiffening material and antacid material comprising anilin.

7. The paint or varnish remover consisting substantially of non-inflammable chlorinated finish solvent material, incorporated miscible finish solvent material, stiffening material and a small proportion of incorporated anilin.

8. The paint or varnish remover comprising volatile organic finish solvents having an acid-forming tendency, stiffening material and antacid material comprising anilin.

9. The paint or varnish remover comprising volatile organic finish solvent material having an acid-forming tendency and antacid material comprising anilin.

10. The paint or varnish remover comprising chlorinated organic solvent material and antacid material comprising anilin.

11. The paint or varnish remover comprising non-inflammable chlorinated organic solvent material, loosening finish solvent material miscible therewith, and antacid material comprising anilin.

12. The paint or varnish remover consisting largely of composite finish solvent material including chlorinated solvent material having an acid-forming tendency and a few per cent. of incorporated volatile organic amino antacid material.

13. The paint or varnish remover comprising composite organic finish solvent material having an acid-forming tendency and incorporated liquid antacid material containing the amino group.

14. The paint or varnish remover consisting essentially of non-aqueous composite finish softening material having an acid tendency and incorporated volatile substantially neutral amino antacid material miscible therewith.

15. The substantially fluent and difficultly flowable paint and varnish remover consisting largely of composite organic finish solvent material including chlorinated solvent material having an acid forming tendency, incorporated waxy stiffening material preventing undesirable evaporation of the remover, and a few per cent. of incorporated volatile organic amino antacid material.

16. The substantially fluent and difficultly flowable paint and varnish remover consisting largely of composite organic finish solvent material having an acid forming tendency, incorporated waxy stiffening material preventing undesirable evaporation of the remover, and incorporated organic amino antacid material miscible therewith.

17. The substantially fluent and difficultly flowable paint and varnish remover consisting largely of composite organic finish solvent material having an acid forming tendency, incorporated stiffening material and a few per cent. of incorporated volatile organic amino antacid material.

18. The substantially fluent and difficultly flowable paint and varnish remover consisting largely of composite organic finish solvent material having an acid forming tendency, incorporated stiffening material and incorporated organic amino antacid material miscible therewith.

19. The substantially fluent and difficultly flowable paint and varnish remover consisting largely of composite organic finish solvent material including chlorinated solvent material having an acid forming tendency, and a few per cent. of incorporated volatile organic amino antacid material.

20. The substantially fluent and difficultly flowable paint and varnish remover consisting largely of composite organic finish solvent material having an acid forming tendency, and incorporated organic amino antacid material miscible therewith.

CARLETON ELLIS.

Witnesses:
 HARRY L. DUNCAN,
 JESSIE B. KAY.

Copies of this patent may be obtained for five cents each, by addressing the "Commissioner of Patents, Washington, D. C."